United States Patent
Shingai

(10) Patent No.: US 8,471,685 B2
(45) Date of Patent: Jun. 25, 2013

(54) NON-CONTACT IC CARD SYSTEM

(75) Inventor: Tomohisa Shingai, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 413 days.

(21) Appl. No.: 12/962,850

(22) Filed: Dec. 8, 2010

(65) Prior Publication Data
US 2011/0140863 A1    Jun. 16, 2011

(30) Foreign Application Priority Data
Dec. 15, 2009    (JP) ................ 2009-284410

(51) Int. Cl.
*H04Q 5/22*    (2006.01)

(52) U.S. Cl.
USPC ....... 340/10.6; 340/10.1; 340/572.1; 340/5.1; 902/25; 902/26; 235/375; 235/380; 235/492; 375/295; 375/316; 361/818

(58) Field of Classification Search
USPC .......... 340/10.1, 10.6, 572.1–572.9, 5.1; 902/25–29; 235/375–385, 492; 361/818
See application file for complete search history.

(56) References Cited

U.S. PATENT DOCUMENTS

| | | | | |
|---|---|---|---|---|
| 7,483,727 B2* | 1/2009 | Zhu et al. | | 455/575.5 |
| 7,508,684 B2* | 3/2009 | Chen et al. | | 361/818 |
| 7,512,386 B2* | 3/2009 | Kalajo et al. | | 455/127.1 |
| 7,791,469 B2* | 9/2010 | Chen et al. | | 340/539.13 |
| 2006/0267769 A1* | 11/2006 | Ito et al. | | 340/572.1 |
| 2009/0115604 A1* | 5/2009 | Thomas et al. | | 340/540 |
| 2009/0273454 A1* | 11/2009 | Onozuka et al. | | 340/10.51 |
| 2010/0136911 A1* | 6/2010 | Sekita et al. | | 455/41.2 |

FOREIGN PATENT DOCUMENTS
JP    2005-173862    6/2005

* cited by examiner

*Primary Examiner* — Benjamin C Lee
*Assistant Examiner* — Ryan Sherwin
(74) *Attorney, Agent, or Firm* — Fujitsu Patent Center

(57) ABSTRACT

A non-contact IC card system includes a non-contact IC card having a display element and an IC card reader/writer communicating with the non-contact IC card. The IC card reader/writer disables detection of a load modulated signal from the non-contact IC card when the non-contact IC card displays data on the display element.

13 Claims, 18 Drawing Sheets

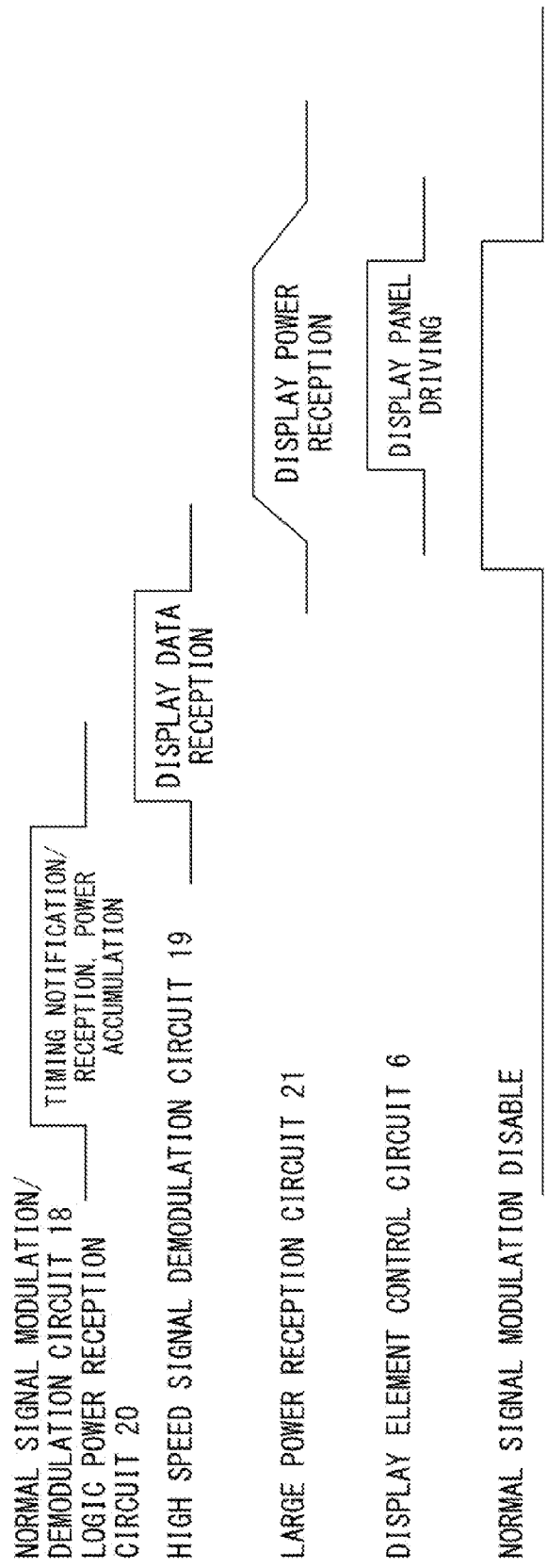

NON-CONTACT IC CARD SYSTEM

CROSS-REFERENCE TO RELATED APPLICATIONS

This application is based upon and claims the benefit of priority of the prior Japanese Patent Application No. 2009-284410, filed on De. 15, 2009, the entire contents of which are incorporated herein by reference.

FIELD

The present invention relates to a non-contact IC card and an IC card system including the non-contact IC card.

BACKGROUND

Nowadays, card systems using non-contact IC cards are broadly used. In addition, a non-contact IC card equipped with a display element has been also used, and an IC card system using a cholesteric liquid crystal as the display element has been proposed. In such a non-contact IC card system, a system configured to be able to realize both stability of data communication and reduction of the driving power of the display element is required. Note that an IC card is also referred to as a smart card.

As an invention to improve stability of data communication, for example, Japanese Laid-open Patent Publication No. 2005-173862 proposes an invention in which, in a non-contact IC card, the level of a received signal is detected, and variable control of the Q factor of the resonance circuit is performed, to stabilize data communication.

However, conventional non-contact IC card systems have following problems. The signal transmission from a non-contact IC card to an IC card reader/writer is performed by load modulation. However, in the case of an IC card equipped with a large-sized display element that covers the entire surface of the IC card, load change occurs as the display element is driven, and the load change is mistakenly regarded as load modulation on the IC card reader/writer side, causing a system error.

In addition, with a large-sized display element that covers the entire surface of the IC card, a large amount of display data is transmitted to the IC card, decreasing the communication speed.

Furthermore, large power consumption is required to drive such a large-sized display element as the one described above, which leads to a shortage of the antenna reception power.

SUMMARY

According to an aspect of the invention, a non-contact IC card system includes a non-contact IC card having a display element and an IC card reader/writer communicating with the non-contact IC card. The IC card reader/writer disables detection of a load modulated signal from the non-contact IC card when the non-contact IC card displays data on the display element.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 18 is a time chart illustrating the processing operation of the fourth embodiment.

DESCRIPTION OF EMBODIMENTS

Hereinafter, embodiments of the present invention are described with reference to drawings.

First Embodiment

Figure 1:
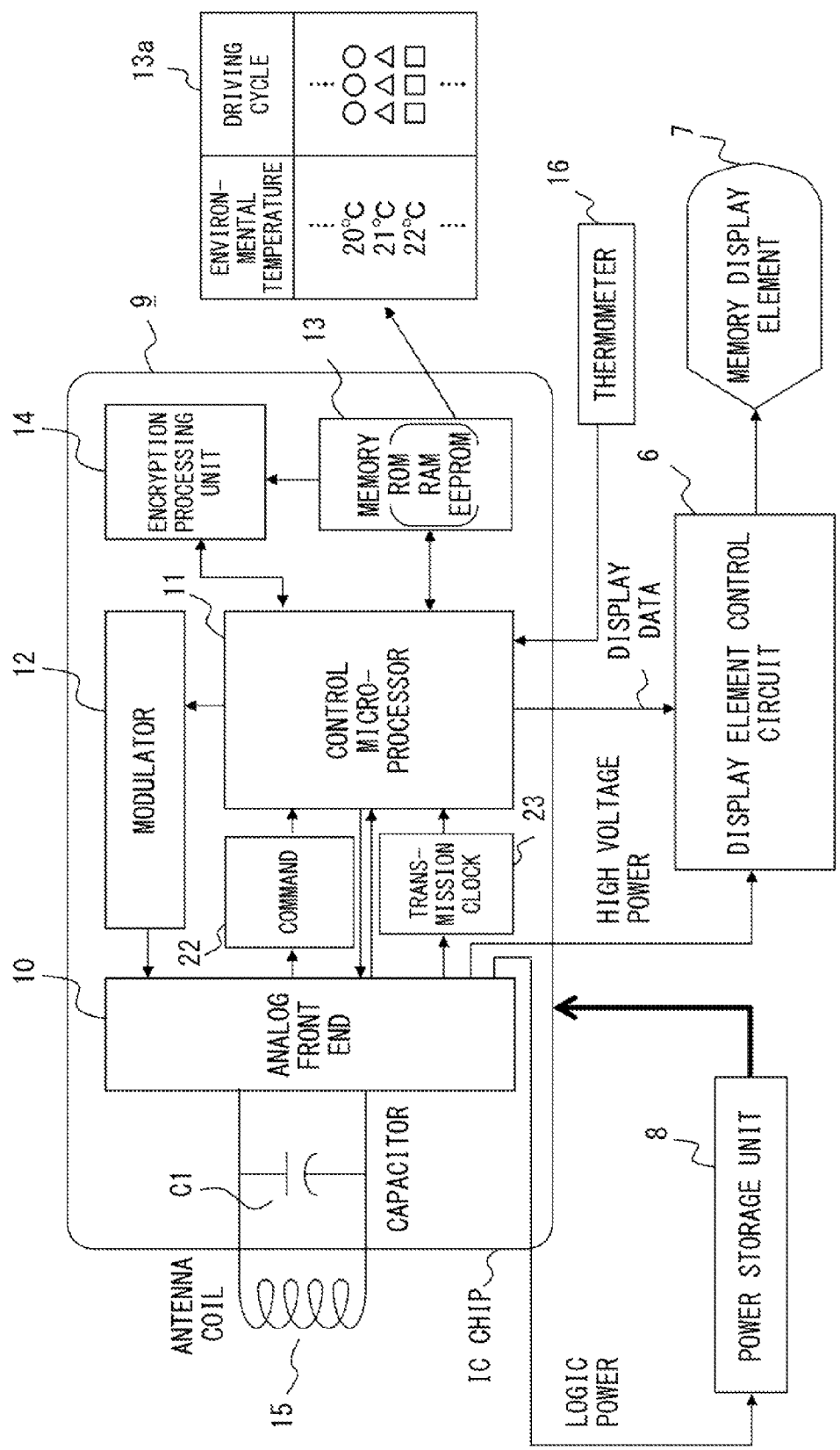
FIG. 1 is a circuit block diagram of an IC card used for a non-contact IC card system of the embodiment.
Figure 2:
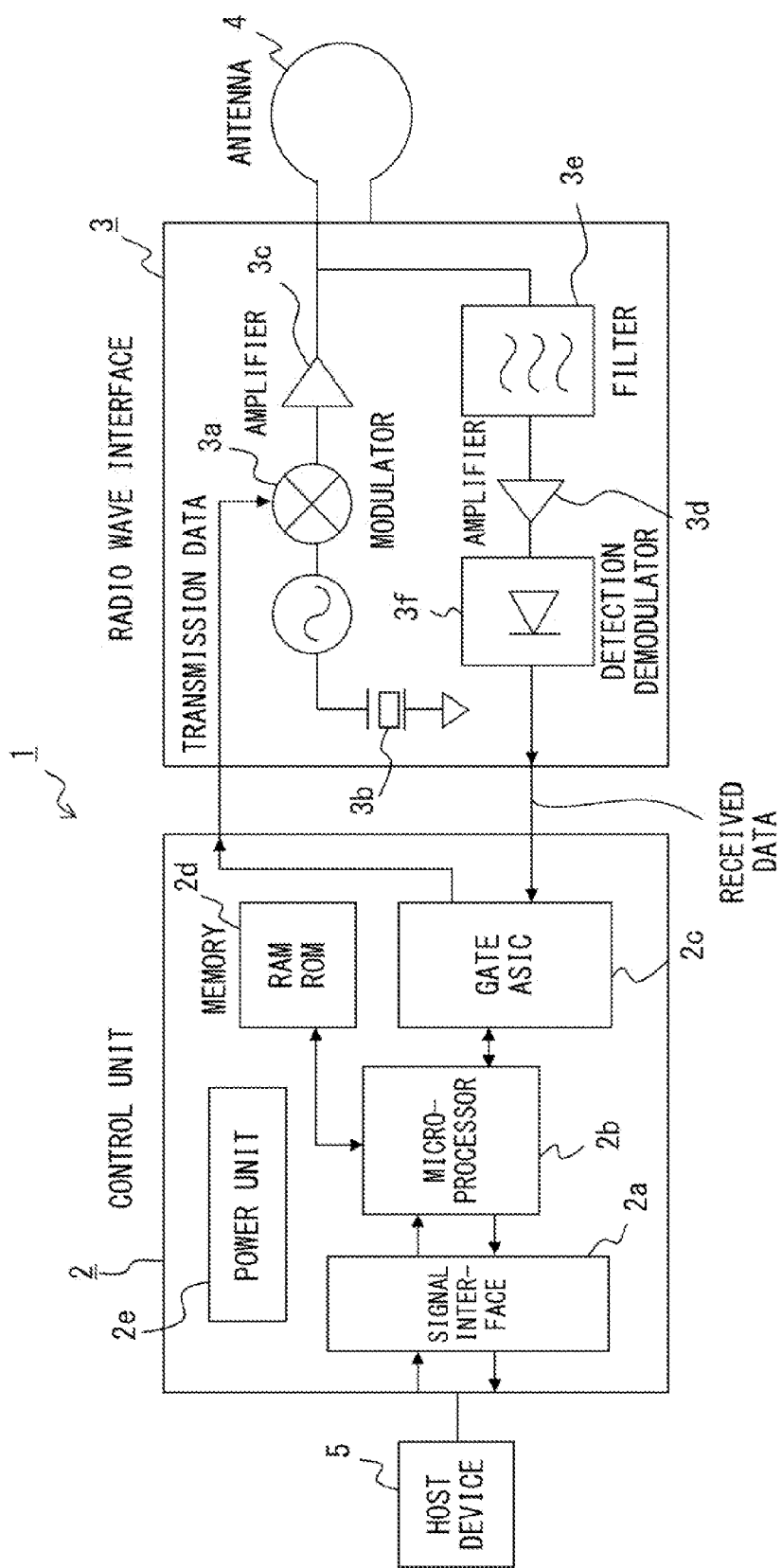
FIG. 2 is a circuit block diagram of an IC card reader/writer.

FIG. 1 illustrates a circuit block diagram of an IC card used for a non-contact IC card system of the embodiments. FIG. 2 is a circuit block diagram of an IC card reader/writer.

As illustrated in FIG. 2, an IC card reader/writer 1 has a control unit 2, a radio wave interface 3 and a loop antenna 4. A host device 5 that provides the IC card reader/writer 1 with applications is connected to the control unit 2. The control unit 2 has a signal interface 2a, a microprocessor 2b, a gate ASIC (application specific integrated circuit) 2c, a memory 2d, and a power unit 2e. According to the application specified by the host device 5, the microprocessor 2b reads out necessary data from the memory 2d including ROM and RAM, generates transmission data and transmits the data to the radio wave interface 3 through the gate ASIC 2c.

The radio wave interface 3 has a modulator 3a, a crystal oscillator 3b, amplifiers 3c, 3d, a filter 3e, and a detection demodulator 3f. Data generated by the control unit 2 is modulated by the modulator 3a according to an oscillation clock from the crystal oscillator 3b, amplified by the amplifier 3c and transmitted to the IC card via the loop antenna 4. On the other hand, a load modulated signal transmitted from the IC card is input to the detection demodulator 3f through the loop antenna 4, the filter 3e and the amplifier 3d, and data is demodulated and transmitted to the control unit 2 as received data.

An IC card that performs data transmission and reception with the IC card reader/writer 1 as described above has, as illustrated in FIG. 1, a display element control circuit 6, a memory display element 7, power storage unit 8, an IC chip 9, and a thermometer 16.

The IC chip 9 has an analog front end 10, a control microprocessor 11, a modulator 12, a memory 13 and an encryption processing unit 14. The analog front end 10 includes a resonance state switching circuit described later, and performs a switching process of the resonance state according to a resonance state switching signal output from the control microprocessor 11. Meanwhile, an antenna coil 15 and a capacitor C1 are connected to the analog front end 10. In addition, a command 22 illustrated in FIG. 1 is a command decoder, and a transmission clock 23 is a transmission clock generator.

The control microprocessor 11 generates the resonance state switching signal and transmission data to the IC card reader/writer 1, and the like. In addition, the control microprocessor 11 performs control of data writing-in to the memory 13 including ROM, RAM, EEPROM and reading-out of data from the memory 13. In addition, the control microprocessor 11 performs an encryption process of data using the encryption processing unit 14. In addition, a table 13a that stores information of the driving cycle of the liquid crystal element corresponding to the temperature is stored in the EEPROM in the memory 13.

The power storage unit 8 is realized using a condenser for example, and a logic power described later is provided. In this case, the capacity of the condenser is equal to or more than 1 mF, assuming the voltage during charging as 10V, the voltage during discharging as 7V, and the load as 5V10 mW×1.5 seconds, for example. In this case, if it is an electric double-layer capacitor for example, it may be mounted on the IC card.

The memory display element 7 is a liquid crystal display element in which a cholesteric liquid crystal that shows a cholesteric phase at the room temperature is enclosed for example. The display element control circuit 6 has a driver IC for driving the memory display element 7 and a control circuit that performs driving control of the driver IC, and the like.

Figure 3:
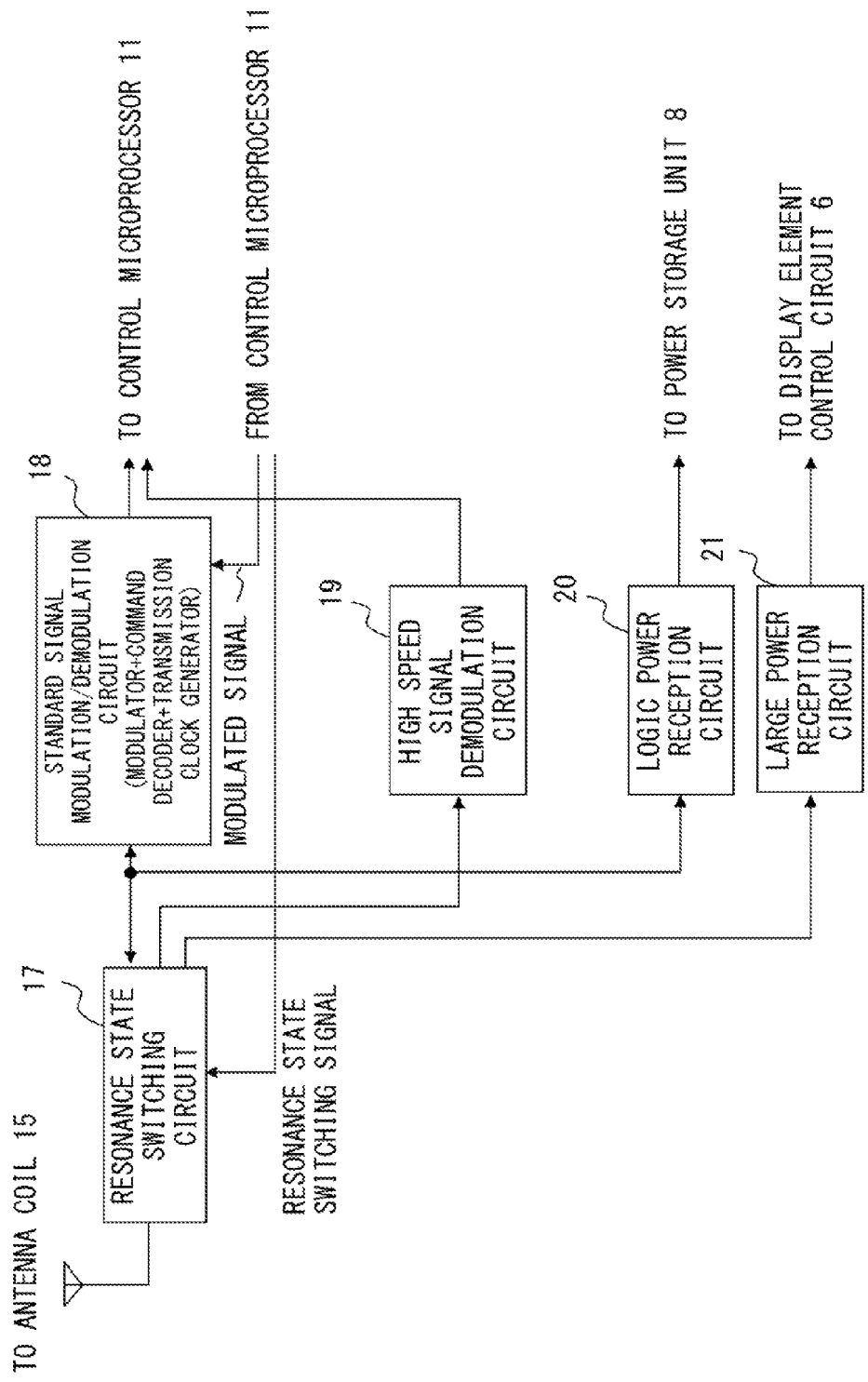
FIG. 3 is a circuit block diagram of an analog front end of the first embodiment.

FIG. 3 is a circuit block diagram of the analog front end 10. In FIG. 3, the analog front end 10 has a resonance state switching circuit 17, a standard signal modulation/demodulation circuit 18, a high speed signal demodulation circuit 19, a logic power reception circuit 20, and a large power reception circuit 21.

The standard signal modulation/demodulation circuit 18 includes the modulator 12, the command decoder 22, and the transmission clock generator 23 illustrated in FIG. 1. The standard signal modulation/demodulation circuit 18 performs a decoding process of a command provided from the IC card reader/writer 1, a demodulation process of received data, a modulation process of transmission data, and the like.

The high speed signal demodulation unit 19 performs high speed demodulation of received data from the IC card reader/writer 1. The high speed signal demodulation unit 19 for example receives display data from the IC card reader/writer 1, performs high speed demodulation of the display data, and transmits the data to the control microprocessor 11.

The logic power reception circuit 20 rectifies a received signal by a rectification regulator and provides the power to the power storage unit 8 as a logic power, during normal resonance state described later.

The large power reception circuit 21 provides the display element control circuit 6 with a high voltage power, when driving the memory display element 7 described above. The large power reception circuit 21 provides an adequate power for driving the display element, even in a case where the memory display element 7 is a large-sized display element that covers the entire surface of the IC card.

Circuit switching of the standard signal modulation/demodulation circuit 18, the high speed signal demodulation circuit 19, the logic power reception circuit 20 and the large power reception circuit 21 is performed by the resonance state switching unit 17.

Figure 4:
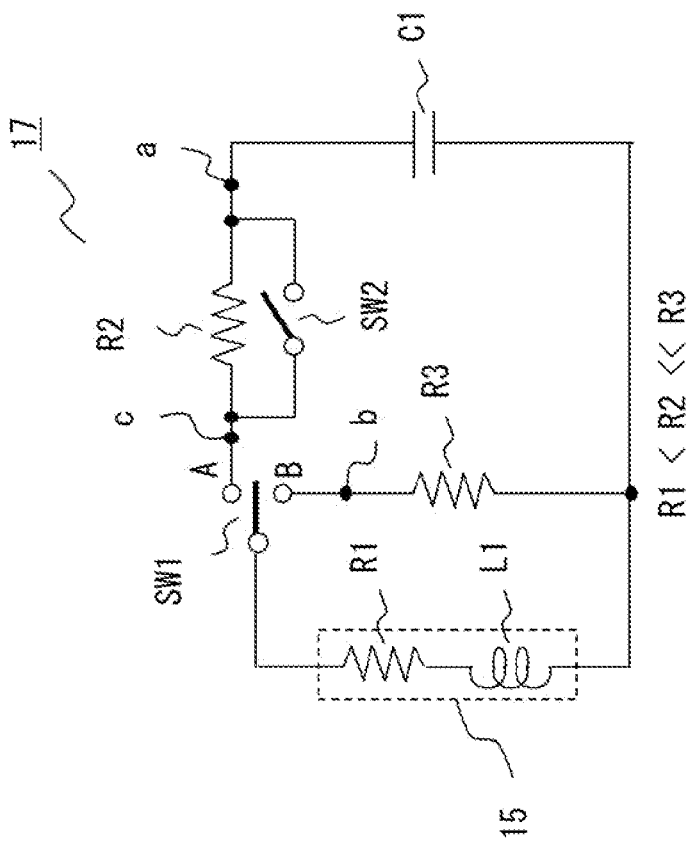
FIG. 4 is a circuit diagram of a resonance state switching circuit of the first embodiment.

FIG. 4 is a circuit diagram of the resonance state switching circuit 17. As illustrated in FIG. 4, the resonance state switching unit 17 has the antenna coil 15, a capacitor C1, switches SW1, SW2, resistors R1-R3. Meanwhile, the antenna coil 15 is illustrated by using only a symbol of coil in FIG. 1 described above, specifically, the antenna coil 15 includes a coil L1 and an internal resistor R1. In addition, the resistance of the internal resistor R1 and the resistance of the resistor R2 are low, and the resistance of the resistor R3 is high. For example, in this example, the internal resistor R1 is 2.5Ω, the resistor R2 is 14.5Ω, the resistor R3 is 1KΩ.

The resonance state switching circuit 17 sets the antenna coil 15 to the non-resonance state, or the normal resonance state, or the high-Q resonance state. For example, as illustrated in the table of FIG. 4, when the switch SW1 is connected to the B terminal, only the resistor R3 is connected to the antenna coil 15, and the non-resonance state is obtained. Meanwhile, when the switch SW1 is connected to the A terminal, if the switch SW2 is off, the resistor R2 and the capacitor C1 are connected to the antenna coil 15, and the normal resonance state is obtained. On the other hand, if the switch SW 2 is on, only the capacitor C1 is connected to the antenna coil 15, and the high-Q resonance state is obtained.

The standard signal modulation/demodulation circuit 18 and the logic power reception circuit 20 are connected to node "a" of the resonance state switching circuit 17; the high speed signal demodulation circuit 19 is connected to node "b" of the resonance state switching circuit 17; and the large power reception circuit 21 is connected to node "c" of the resonance state switching circuit 17. For example, when the resonance state switching circuit 17 is set to the non-resonance state, the high speed signal modulation circuit 19, which is connected to the node "b", is activated. When the resonance state switching circuit 17 is set to the normal resonance state, the standard signal modulation/demodulation circuit 18 and the logic power reception circuit 20, both of which are connected to the node "a", are activated. When the resonance state switching circuit 17 is set to the high-Q resonance state, the large power reception circuit 21, which is connected to the node "c", is activated.

Figure 5:
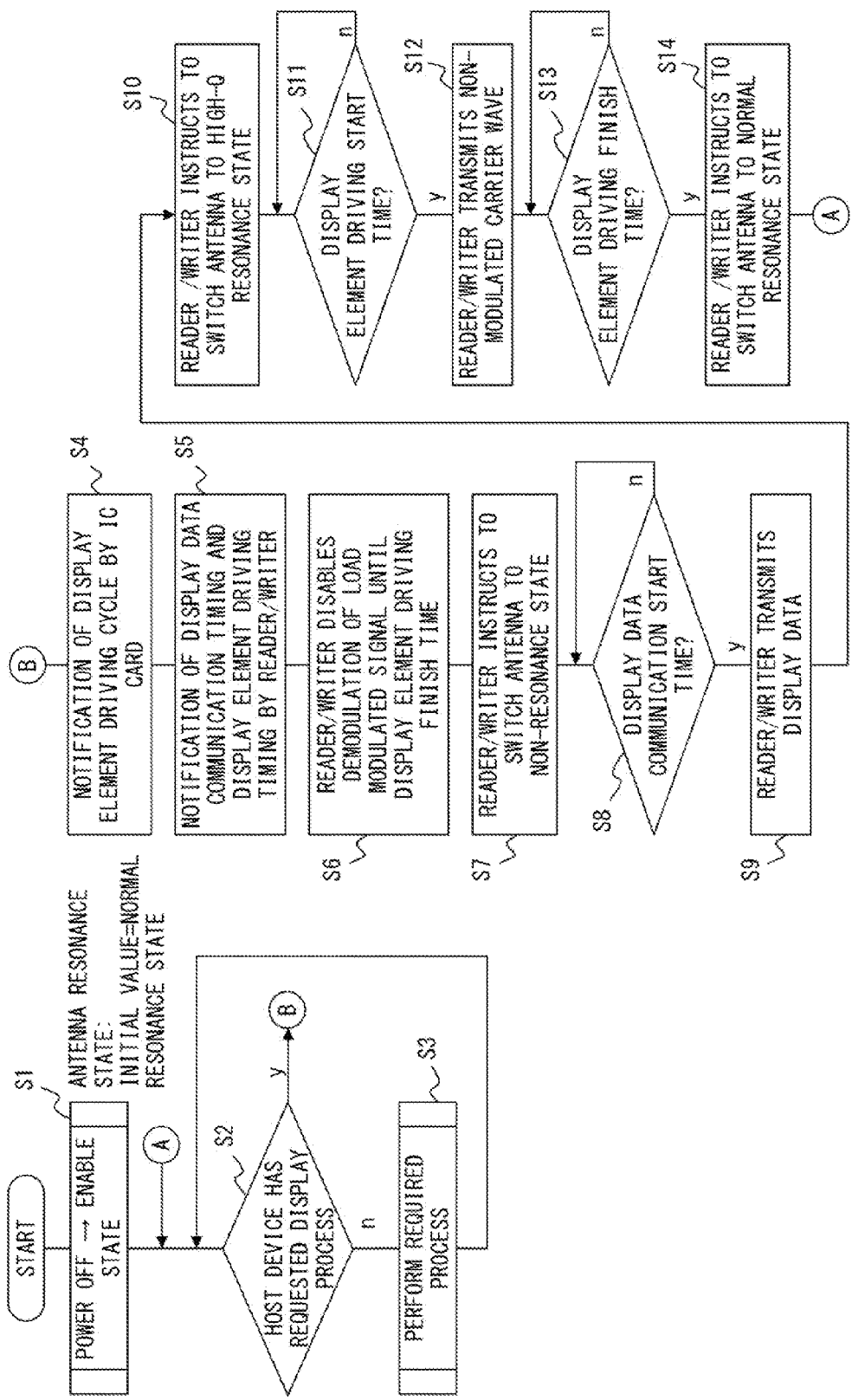
FIG. 5 is a flowchart illustrating the processing operation of the first embodiment.
Figure 6:
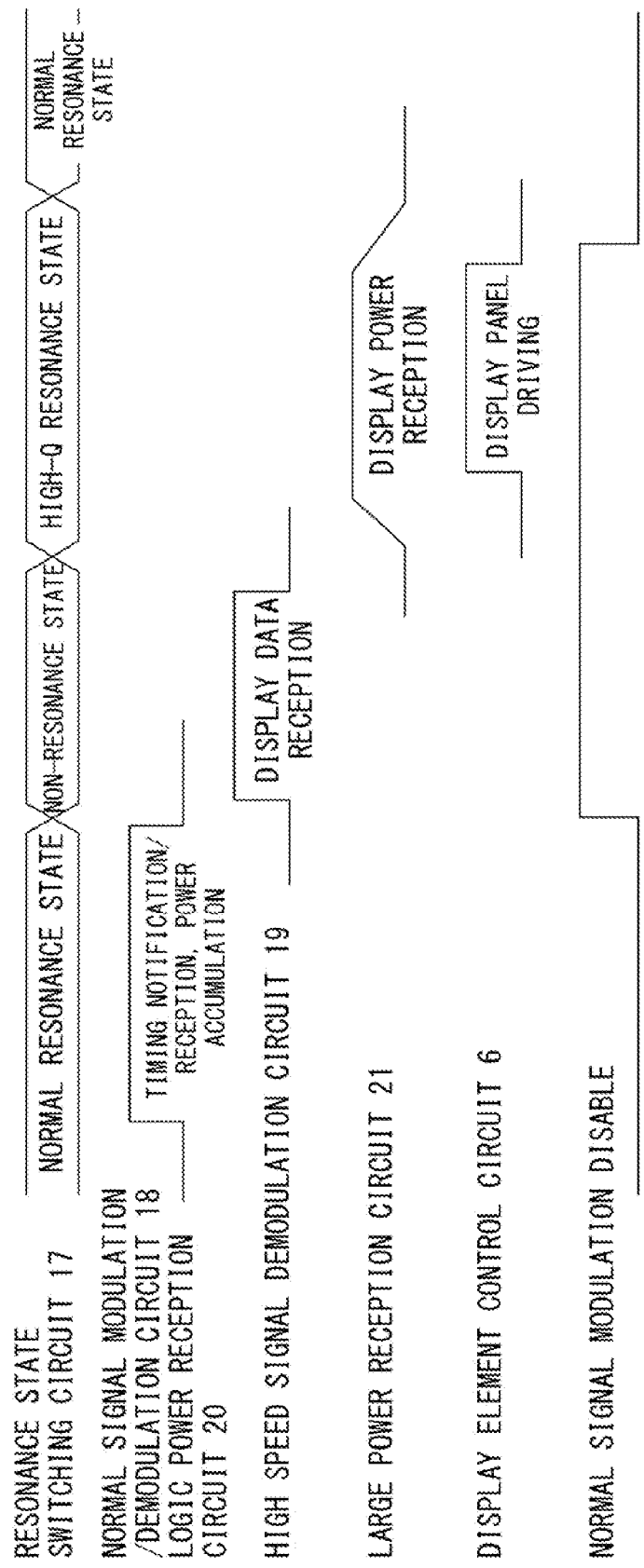
FIG. 6 is a time chart illustrating the processing operation of the first embodiment.

FIG. 5 is a flowchart illustrating the processing operation of the first embodiment. FIG. 6 is a time chart illustrating the processing operation of the first embodiment. First, when the IC card is at a position sufficiently distant from the IC card reader/writer 1, the antenna coil is in the off state, and the voltage induced in the antenna coil 15 is zero.

In this state, when the IC card approaches the IC card reader/writer 1, the antenna coil 1 enters the normal oscillation state as the initial state, and a low voltage of less than several Volts is induced in the antenna coil 15.

After that, when the IC card further approaches the IC card reader/writer 1, the reception level of a transmission signal from the IC card reader/writer 1 increases, and the voltage induced in the antenna coil 15 also increases. Then, when the IC card enters the communication range of the IC card reader/writer 1, while the antenna coil 15 remains in the normal-oscillation state, several Volts to a dozen Volts voltage is induced in the antenna coil 15, and an initial setting process of the IC card is performed, to make it enter the enabled state (step (hereinafter, indicated by S) 1). For example, as the initial setting process, the authentication process of the IC card, a resetting process of the IC card and the like are performed. In addition, transmission/reception of a timing signal, driving of the logic power reception circuit 20 and power accumulation in the power storage unit 8 are performed (the first normal resonance state illustrated in FIG. 6).

Next, whether the host device 5 has performed request of a display process is determined (S2). Here, if the request from the host device 5 is not a request of a display process (NO in S2), the corresponding requested process is performed (S3). The host device 5 performs, other than request of a display process, other requests such as data reception request, and if the request from the host device 5 is not a request of a display process, a corresponding process specified by the host device 5 is performed.

On the other hand, if the request from the host device 5 is a request of a display process (YES in S2), the process to display the display data transmitted from the IC card reader/writer 1 on the memory display element 7.

First, the IC card notifies the IC card reader/writer 1 of the driving cycle of the memory display element 7 (S4). The memory display 7 includes cholesteric liquid crystal and the driving cycle of the liquid crystal element changes according to the temperature. Thus, the IC card notifies the IC card reader/writer 1 of the driving cycle of the display element corresponding to the temperature. For example, if the environmental temperature of the IC card is high, the driving cycle of the memory display element 7 is short, and if the environmental temperature of the IC card is low, the driving cycle of the memory display element 7 is long.

Specifically, the thermometer 16 detects the environmental temperature of the IC card, and notifies the control microprocessor 11 of the detected temperature. The control microprocessor 11 refers to the table 13*a* in EEPROM of the memory 13, obtains information of the driving cycle corresponding to the detected temperature, and notifies the IC card reader/writer 1 of the obtained information of the driving cycle.

It is possible to detect the temperature and calculate the driving cycle of the memory display element 7 in the IC card reader/writer. However, control with better accuracy is expected when the temperature is detected in the IC card.

The IC card reader/writer 1 notifies the IC card of the communication timing of display data to be transmitted later, and the driving timing of the display element (S5). The setting of the communication timing of display data is performed by the microprocessor 2*b,* and the communication finish time is calculated from the communication start time and the byte count of the display data to be transmitted. For example, when the communication start time is determined, the communication finish time is calculated from information of the transfer speed from the IC card reader/writer 1 to the IC card and the byte count, and information of the communication start time and the communication finish time is stored in the RAM (memory 2*d*) as well as being transmitted to the IC card. Meanwhile, the communication start time of the display data is the time obtained by setting aside the time for a transmission preparation process performed by the microprocessor 2*b* after the host device 5 issued a transmission request of display data.

In addition, the driving timing of the display element is calculated from the driving start time of the display element and information of the driving cycle from the IC card. For example, the driving start time of the display element is set as the reception completion time of the display data, and the driving finish time of the display element is calculated according to the driving start time and the driving cycle of the display element. Information of the driving start time and the driving finish time is also stored in the RAM (memory 2*d*) as well as being transmitted to the IC card.

Next, the IC card reader/writer 1 disables the demodulation process of the load modulated signal in the detection modulator 3*f,* until the driving finish time of the display element (S6). This process is to read out the information of the driving finish time of the display element stored in the RAM (memory 2*d*) by the microprocessor 2*b* to disable the demodulation process of the load modulated signal in the detection modulator 3*f.* According to this process, thereafter (until the driving finish time), the IC card reader/writer 1 does not demodulate the load modulated signal from the IC card. Therefore, during the display process of the memory display element 7 for example, even if load change occurs in the IC card, the IC card reader/writer 1 does not detect the load change as a load modulated signal.

Then, the IC card reader/writer 1 issues an instruction to switch the antenna coil 15 of the IC card into the non-resonance state (S7). This instruction is input to the control microprocessor 11 through the analog front end 10. The control microprocessor 11 outputs a resonance state switching signal according to the instruction. The resonance state switching circuit 17 switches the switch SW1 illustrated in FIG. 4 to the B terminal, and sets the antenna coil 15 to the non-resonance state.

By this process, the IC card is set to the non-resonance state illustrated in FIG. 6, and the high speed signal demodulation circuit 19 illustrated in FIG. 3 is driven. Then, the IC card waits for start of the communication of the display data (NO in S8). The start of the communication of the display data is set by the process (S5) described above, and when the preset communication start time comes (YES in S8), the IC card reader/writer 1 transmits the display data to the IC card (S9). At this time, the antenna of the IC card is set to the non-resonance state, and the display data is transmitted to the IC card at a high speed. In the non-resonance state of the antenna, the reception voltage becomes about $1/10$ of that during resonance state, while the frequency range of receivable signals included in the carrier wave widens, enabling high speed reception of the display data.

Next, the IC card reader/writer 1 issues an instruction to switch the antenna of the IC card into the high-Q resonance state (S10). This instruction is also input to the control microprocessor 11 after command analysis is performed in the analog front end 10. According to this instruction, the control microprocessor 11 outputs a resonance state switching signal to switch the switch SW1 illustrated in FIG. 4 to the A terminal, and further to switch the switch SW2 to ON to set the antenna to the high-Q resonance state.

By the process described above, the IC card is set to the high-Q resonance state (the high-Q resonance state illustrated in FIG. 6), and the large power reception circuit 21 illustrated in FIG. 3 is driven. Then, the IC card waits until the drive start time of the display element comes (NO in S11).

The driving start time of the display element is set by the process in step S5. Then, when the preset driving start time comes (YES in S11), the IC card reader/writer 1 transmits non-modulated carrier wave to the IC card (S12). At this time, the antenna of the IC card is set to the high-Q resonance state as described above. Therefore, the IC card effectively receives the non-modulated carrier wave, and provides the display element control circuit 6 with a high voltage of about 30V for example.

The display element control circuit 6 drives the memory display element 7 with the provided power, and displays display data transmitted from the control microprocessor 11 on the display element 7. At this time, even if the memory display element 7 is a large-screen display element and load change occurs in the IC card, the detection demodulator 3f has disabled the demodulation process of the load modulated signal in the IC card reader/writer 1. Therefore, load change in the IC card due to the display process of the memory display element 7 does not negatively affect the IC card reader/writer 1.

Next, whether the drive finish time of the memory display element 7 has come is determined (S13). When the drive finish time of the memory display element 7 has come (YES in S13), the IC card reader/writer 1 issues an instruction to switch the antenna of the IC card into the normal resonance state (S14). The IC card reader/writer 1 stored information about the driving finish time of the memory display element 7, and when the finish time comes, the IC card reader/writer 1 issues a switching instruction to switch the antenna into the normal resonance state. Therefore, the IC card is set to the normal resonance state thereafter (the latter normal resonance state illustrated in FIG. 6), and waits for a new request from the host device 5 (S2).

By the process described above, display data transmitted from the IC card reader/writer 1 is displayed on the memory display element 7 of the IC card. In particular, according to the present embodiment, when the display process on the memory display element 7 is performed, the detection demodulator 3f has disabled the demodulation process of the load modulated signal, so even when load change occurs in the IC card, it does not affect the IC card reader/writer 1.

In addition, since the transmission of display data is performed in the non-resonance state, the communication process can be performed at a high speed, and even display data with a large data amount for a large-sized display element that covers the entire surface of the IC card may be transmitted at a sufficiently high speed.

Furthermore, when displaying display data on the memory display element 7, since the non-modulated carrier wave is received in the high-Q resonance state, a sufficient power is secured at the IC card side. Therefore, even with display on a large-sized display element that covers the entire surface of the IC card, shortage of reception power does not occur.

Figure 7:
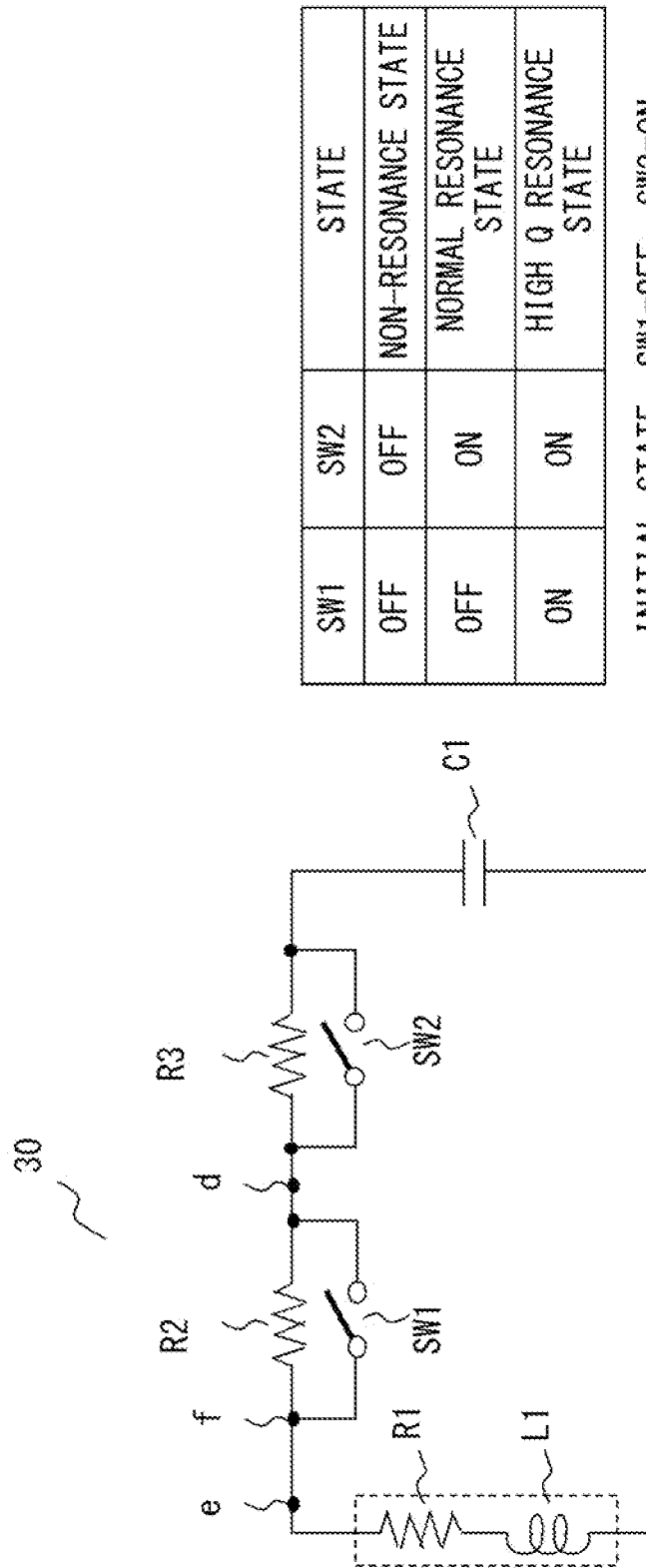
FIG. 7 is another circuit diagram of a resonance state switching circuit.

Meanwhile, while the resonance state switching circuit 17 configured as illustrated in FIG. 4 is used in the description of the first embodiment above, there is no limitation to the circuit, and the configuration may also be made using a resonance state switching circuit 30 illustrated in FIG. 7. In the resonance state switching circuit 30 illustrated in FIG. 7, the capacitor C1 is connected in parallel with the antenna coil 15. In addition, a parallel circuit having the resistor R2 and the switch SW1, and a parallel circuit having the resistor R3 and the switch SW2 are connected in series between the antenna coil 15 and the capacitor C1. Meanwhile, the relationship of resistance values among the resistors R1-R3 is the same as that in the example illustrated in FIG. 4.

In the resonance state switching circuit 30 illustrated in FIG. 7, the non-resonance state is provided by setting both the switches SW1 and SW2 to OFF; the normal-resonance state is provided by setting the switch SW1 to OFF and the switch SW2 to ON; and the high-Q resonance state is provided by setting both the switches SW1 and SW2 to ON.

In the resonance state switching circuit 30 illustrated in FIG. 7, the normal signal modulation/demodulation circuit 18 is connected to node "d" illustrated in FIG. 7; the high speed signal demodulation circuit 19 is connected to node "e"; and the large power reception circuit 21 is connected to node "f".

Assuming the inductance of the coil L1 of the antenna coil 15 as 2 µH, the capacity of the capacitor H1 as 68.88 pF, the resonance frequency (fo) is calculated as follow.

fo=1/{2π√(L1C1)}1=13.56 MHz

In addition, when the resistance of the internal resistor R1 is 2.5Ω, the Q in the high-Q resonance state is calculated as follow.

high–Q=2πfoL1/R1=68.2.

In addition, when the resistance of the resistor R2 is 14.5Ω, the Q in the normal resonance state is calculated as follow.

Q=2πfoL1/(R1+R2)=10.0

In addition, assuming the resistance of the resistor R3 is 1 kΩ, and the antenna coil terminal voltage (no load state) as a typical value of 1V, then the voltage (no load state) in the normal resonance state is 10.0V and the voltage (no load state) in the high-Q resonance state is 68.2V.

Second Embodiment

Figure 8:
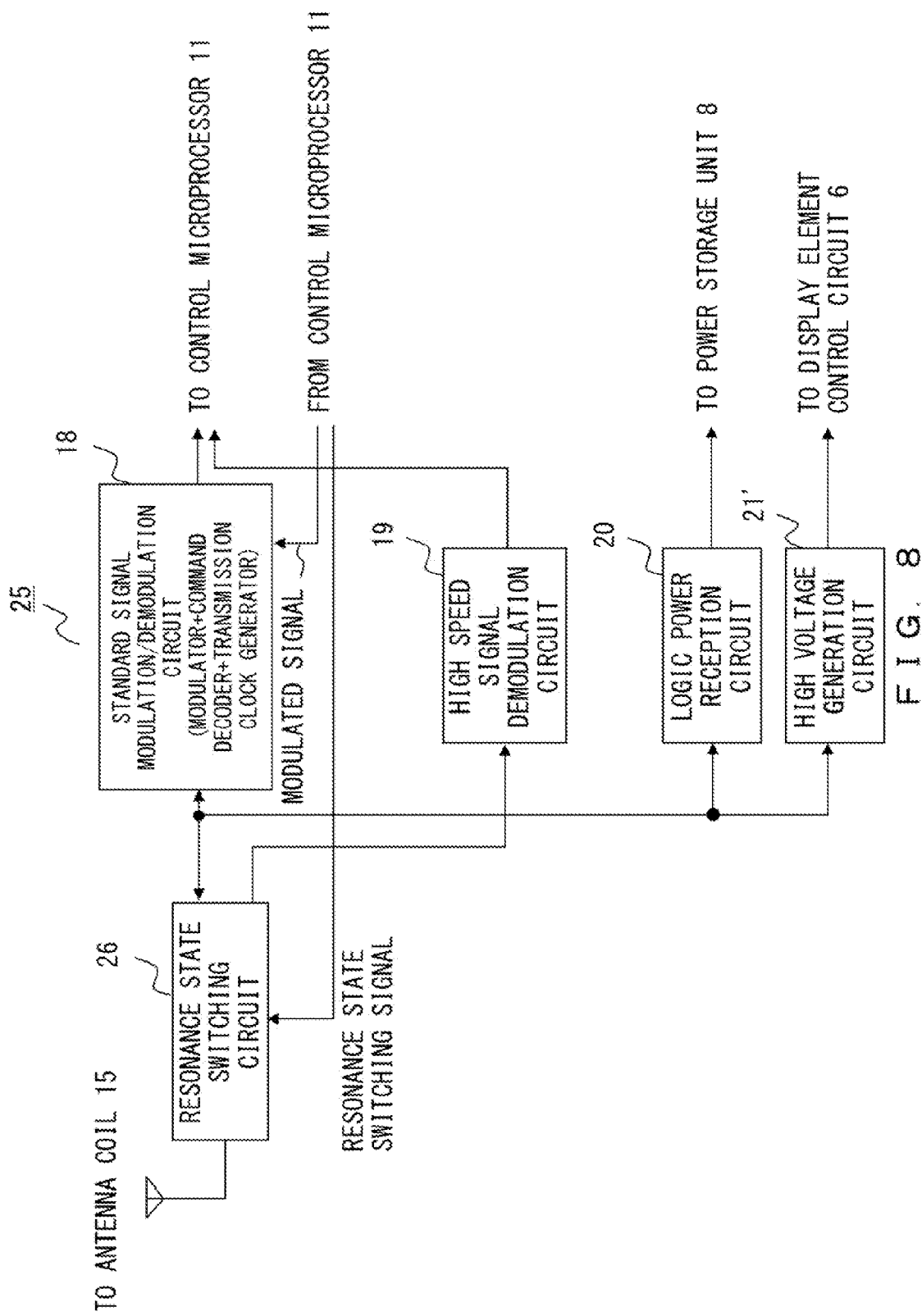
FIG. 8 is a circuit block diagram of an analog front end of the second embodiment.

FIG. 8 is a circuit diagram of an analog front end relating to the second embodiment. Meanwhile, also in the second embodiment, it is assumed that the IC card illustrated in FIG. 1 and the IC card reader/writer 1 illustrated in FIG. 2 are used. Hereinafter, specific explanation is provided.

While the circuit configuration of the analog front end 25 used in the second embodiment is similar to the analog front end 10 of the first embodiment, a high voltage generation circuit 21' is used in the second embodiment instead of the large power reception circuit 21. In addition, a resonance state switching circuit 26 of the second embodiment does not have the switch SW2 provided in the resonance state switching circuit 17 in FIG. 4.

In the second embodiment, the antenna coil 15 can be set to either of the non-resonance state or the normal resonance state by switching the switch SW1. That is, as illustrated in FIG. 9, the antenna coil 15 is set to the non-resonance state by connecting the switch SW1 to the B terminal, and to the normal resonance state by connecting the switch SW1 to the A terminal.

Figure 9:
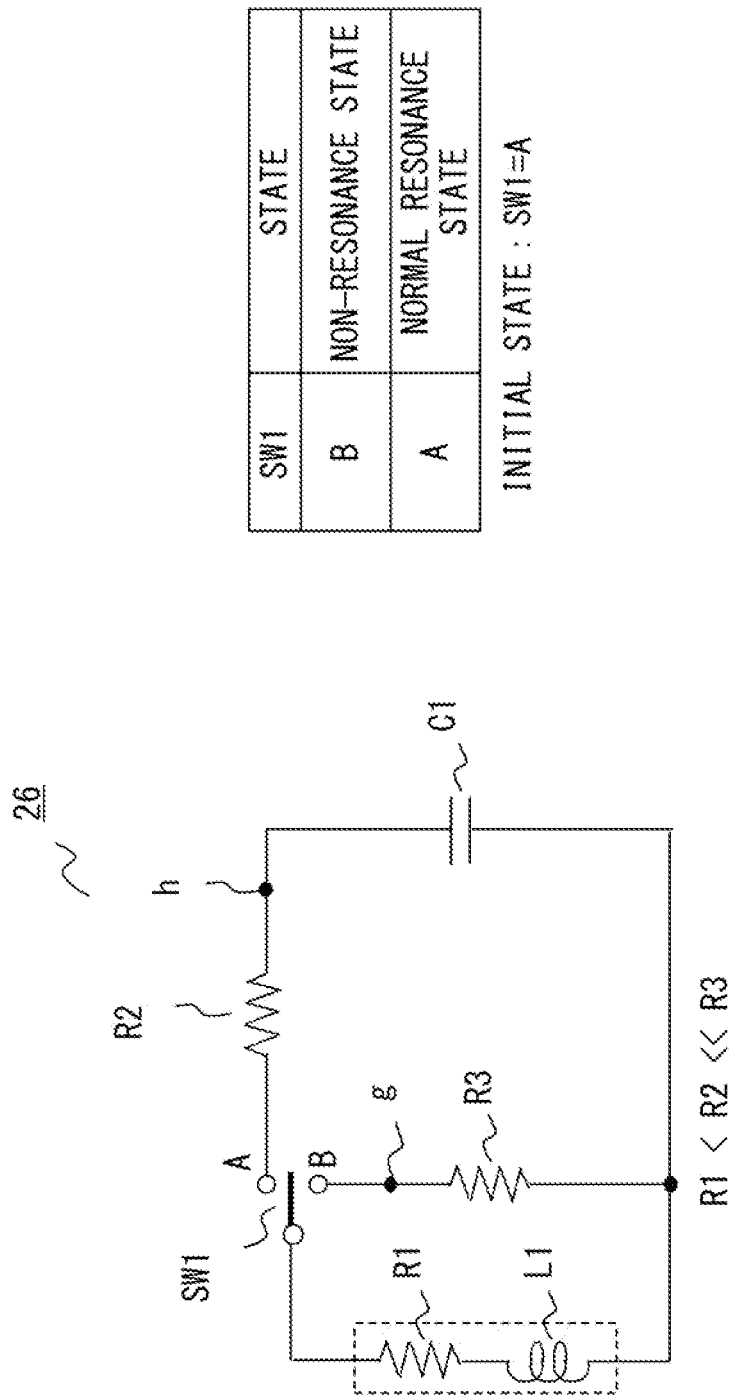
FIG. 9 is a circuit diagram of a resonance state switching circuit of the second embodiment.

The normal signal modulation/demodulation circuit 18 and the logic power reception circuit 20 are connected to node "g" of the resonance state switching circuit 26 illustrated in FIG. 9, and the high speed signal demodulation circuit 19 is connected to node "h" of the resonance state switching circuit 26. Therefore, when the resonance state switching circuit 26 is set to the non-resonance state, the high speed signal demodulation circuit 19 is activated, and when the resonance state switching circuit 26 is set to the normal resonance state, the normal signal modulation/demodulation circuit 18 and the logic power reception circuit 20 are activated.

Figure 10:
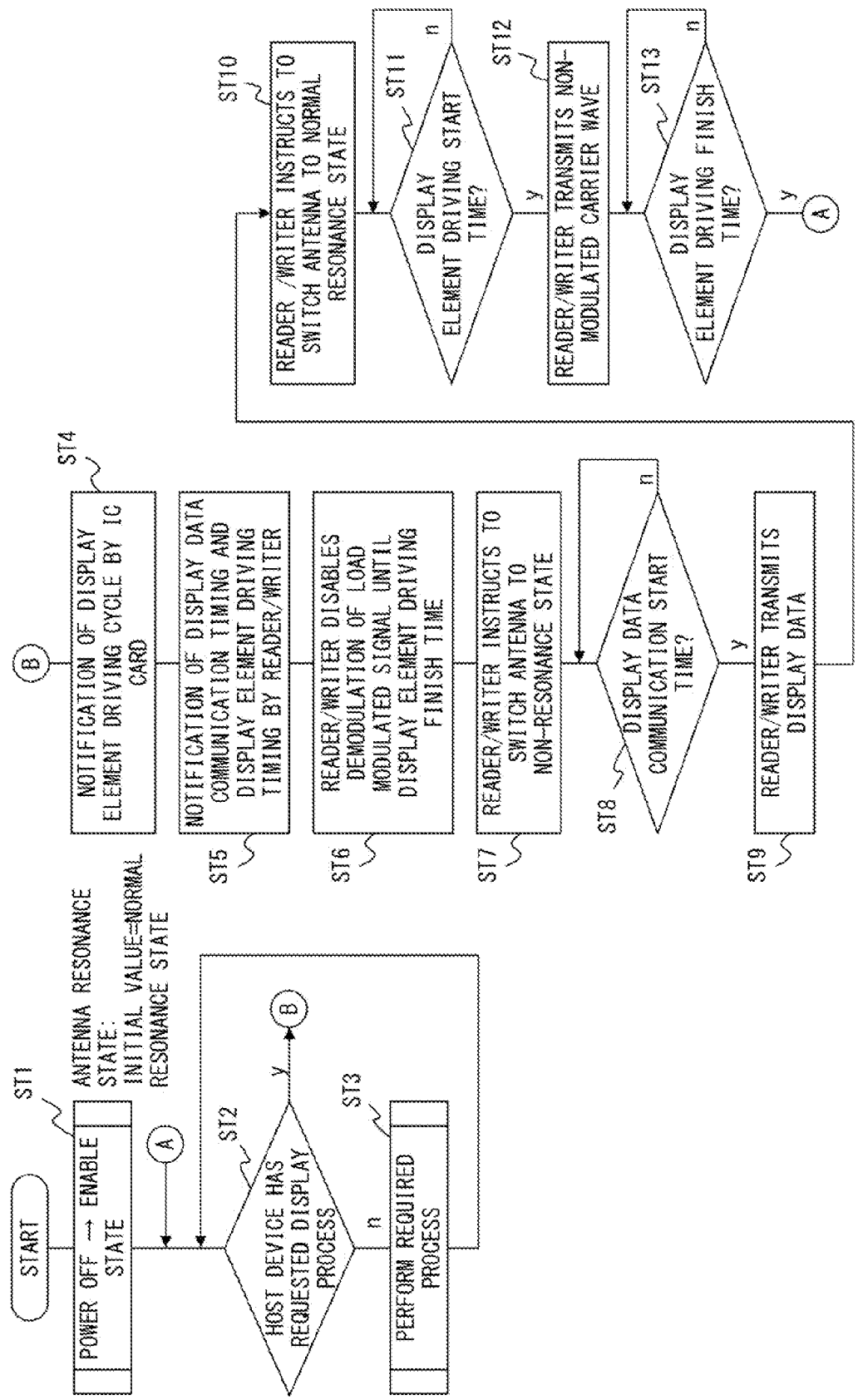
FIG. 10 is a flowchart illustrating the processing operation of the second embodiment.
Figure 11:
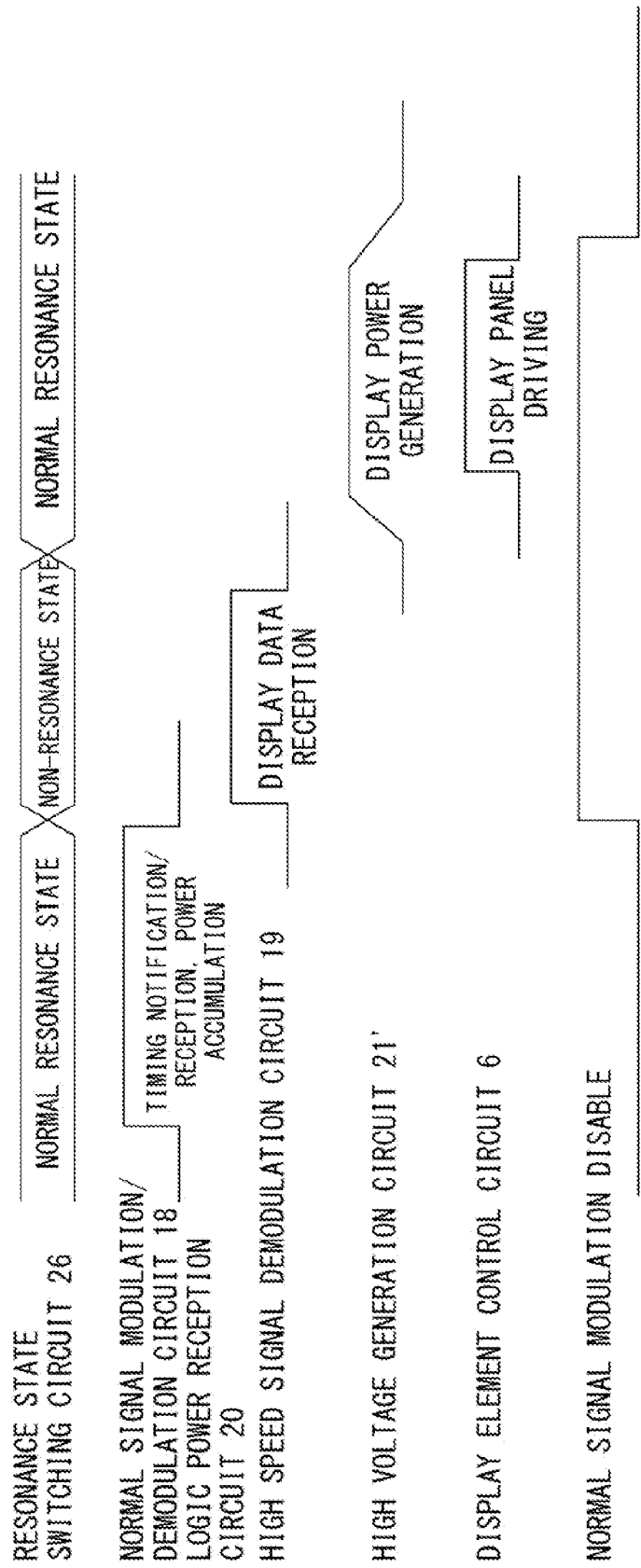
FIG. 11 is a time chart illustrating the processing operation of the second embodiment.

FIG. 10 is a flowchart illustrating the processing operation of the second embodiment. FIG. 11 is a time chart illustrating the processing operation of the second embodiment. First, when the IC card is in a position distant from the IC card reader/writer 1, the power of the IC card is in the off state. When the IC card is brought close to the IC card reader/writer 1, the IC card is enabled in the same manner as described above and enters the normal resonance state, and the initial setting process such as an authentication process is performed ((step (hereinafter, indicated by ST) 1), the first normal resonance state illustrated in FIG. 11).

Next, whether the host device 5 has performed request of the display process is determined (ST2). Here, if the request from the host device 5 is not a request of a display process (NO in ST2), the requested process is performed (ST3).

On the other hand, if the request from the host device 5 is a request of a display process (YES in ST2), the process to perform display of display data transmitted from the IC card reader/writer 1 on the memory display element 7 is started.

First, in the same manner as in the first embodiment, the IC card notifies the IC card reader/writer 1 of the driving cycle of the memory display element 7 (ST4). Next, the IC card reader/writer 1 notifies the IC card of the communication timing of display data to be transmitted and the driving timing of the display element (ST5). The calculation method of the communication timing of the display data and the driving timing of the display element may be the same as that in the first embodiment, and information of the communication start time and the communication finish time of the display data and information of the driving start time and the driving finish time of the display element is stored in the RAM (memory 2*d*).

Next, the IC card reader/writer 1 disables the demodulation process of the load modulated signal in the detection modulator 3*f* mentioned above, until the driving finish time of the display element (ST6). By this process, influence of load change in the IC card due to the display process of the memory display element 7 is avoided.

Next, the IC card reader/writer 1 issues an instruction to switch the antenna of the IC card into the non-resonance state (ST7). According to this instruction, the control microprocessor 11 outputs a resonance state switching signal to an analog front end 10, and switches the switch SW1 illustrated in FIG. 9 to the B terminal.

By this process, the IC card is set to the non-resonance state (the non-resonance state illustrated in FIG. 11), and the high speed signal demodulation circuit 19 illustrated in FIG. 8 is driven. Then the IC card waits for the communication start of the display data (NO in ST8).

In the similar manner as in the first embodiment, the communication start time of the display data is set by the process (ST5), and when the communication start time of the display data comes (YES in ST8), the IC card reader/writer 1 transmits the display data to the IC card (S9). That is, the display data is transmitted to the IC card at a high speed.

Next, the IC card reader/writer 1 issues an instruction to switch the antenna coil 15 of the IC card into the normal resonance state (ST10). According to this process, a resonance state switching signal is output from the control microprocessor 11, and the switch SW1 is switched to the A terminal. Accordingly, the IC card enters the normal resonance state.

By the process described above, the IC card is set to the normal resonance state (the normal resonance state illustrated in FIG. 11), and the logic power reception signal 20 illustrated in FIG. 8 is driven. In addition, the IC card waits for the driving start time of the display element (NO in ST11).

The driving start time of the display element is also set in step ST5, and when the driving start time comes (YES in ST11), the IC card reader/writer 1 transmits non-modulated carrier wave to the IC card (ST12) to generate a high voltage power to drive the memory display element 7.

In the IC card, the display element control circuit 6 drives the memory display element 7, and displays the data transmitted from the control microprocessor 11 on the memory display element 7. At this time, even if load change occurs in the IC card, the detection modulator 3*f* has disabled the demodulation process of the load modulated signal in the IC card reader/writer 1 as described above. Therefore, load change in the IC card does not affect the IC card reader/writer 1.

After that, whether the driving finish time of the memory display element 7 has come is determined (ST13). When the driving finish time comes (YES in ST13), the display process described above is terminated, and the IC card reader/writer 1 waits for a new request from the host device 5 (ST2).

According the procedure described above, in the second embodiment, when the display process on the memory display element 7 is performed, the detection demodulator 3*f* has disabled the demodulation process of the load modulated signal. Therefore, even if load change occurs in the IC card, it does not cause a system error in the IC card reader/writer 1.

In addition, since transmission of display data is performed in the non-resonance state as described above, the communication process is performed at a high speed, and even display data with a large data amount is transmitted sufficiently. Therefore, the non-contact IC card system of the second embodiment is effective when the communication time of display data needs to be shortened.

Note that while the resonance state switching circuit 26 configured as illustrated in FIG. 9 is used in the description regarding the second embodiment, the second embodiment is not limited to this circuit. That is, in the second embodiment, the configuration may also be made using a resonance state switching circuit illustrated in FIG. 12 for example. In a resonance state switching circuit 24 illustrated in FIG. 12, the capacitor C1 is connected in parallel with the antenna coil 15. In addition, between the antenna coil 15 and the capacitor C1, the resistor R2, and a parallel circuit of the resistor R3 and the switch SW2 are connected in series. In addition, the relationship of the resistance among the internal resistor R1, the resistor R2 and the resistor R3 is the same as described above.

Figure 12:
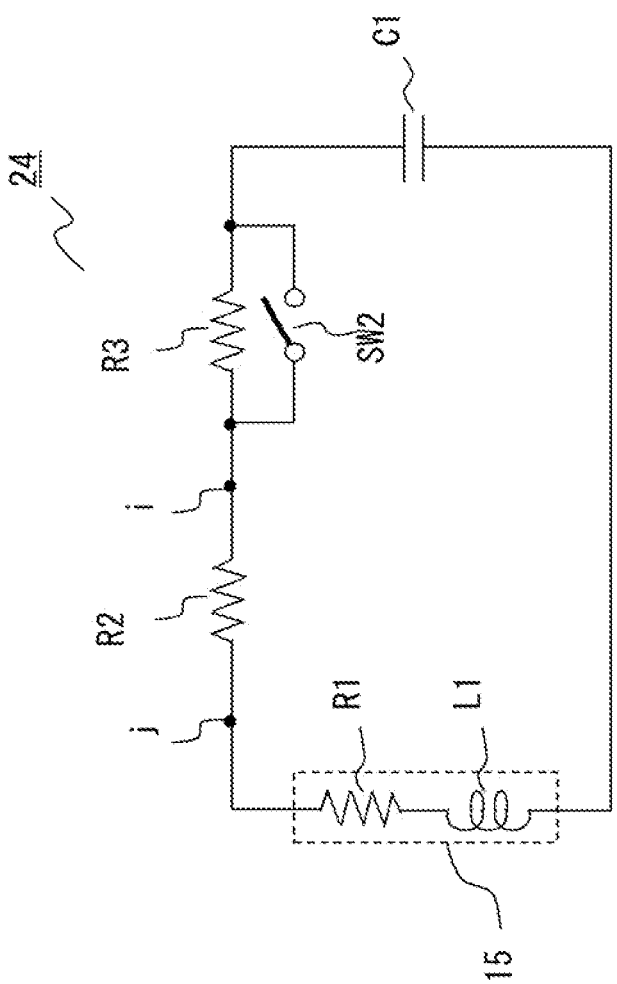
FIG. 12 is another circuit diagram of a resonance state switching circuit.

Meanwhile, in a case in which the resonance state switching circuit 24 illustrated in FIG. 12 is used, the standard signal modulation/demodulation circuit 18 and the logic power reception circuit 20 are connected to node """ of the resonance state switching circuit 24, and the high speed signal demodulation circuit 19 is connected to node "j" of the resonance state switching circuit 24.

Third Embodiment

Figure 13:
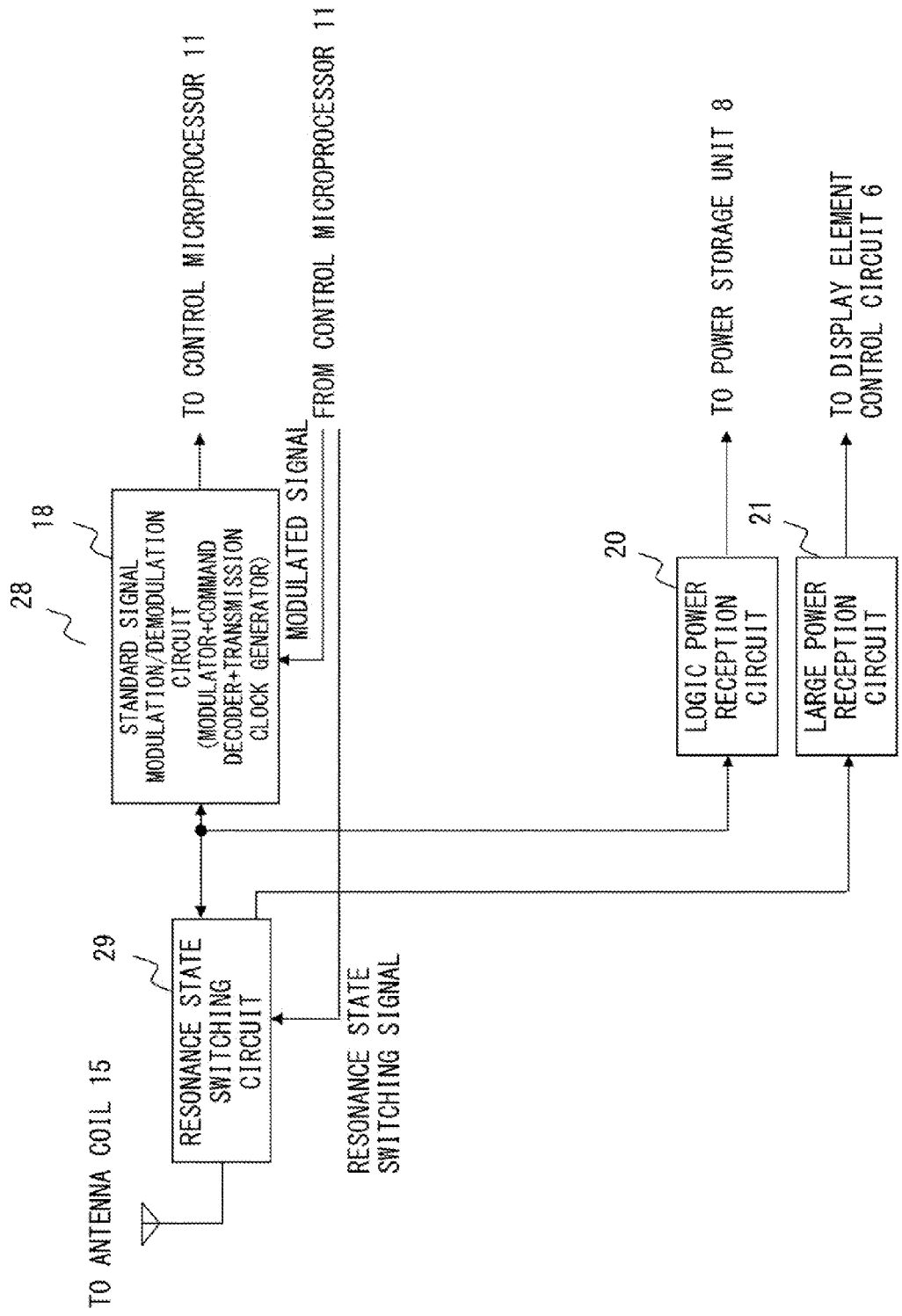
FIG. 13 is a circuit block diagram of an analog front end of the third embodiment.

FIG. 13 is a circuit diagram of an analog front end used in the third embodiment. It is also assumed that the IC card illustrated in FIG. 1 and the IC card reader/writer 1 illustrated in FIG. 2 are used in the third embodiment. Hereinafter, specific explanation is provided.

Figure 14:
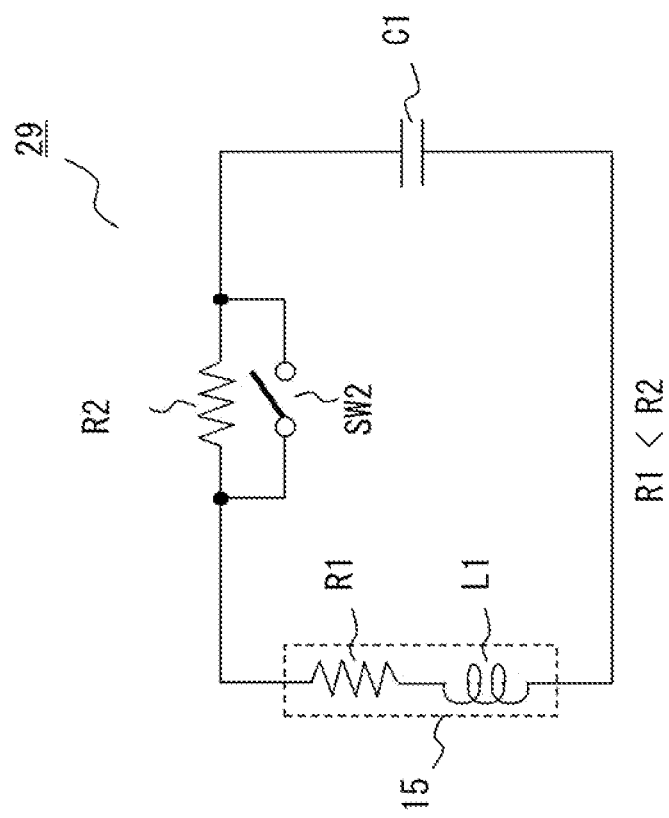
FIG. 14 is a circuit diagram of a resonance state switching circuit of the third embodiment.

The circuit configuration of an analog front end 28 used in the third embodiment is different from that in the first embodiment illustrated in FIG. 3, and the high speed demodulation circuit 19 is not used. FIG. 14 illustrates the configuration of a resonance state switching circuit 2 9 in the third embodiment. Compared to the resonance state switching circuit 17 in FIG. 4, the switch SW1 and the resistor R3 are removed in the resonance state switching circuit 29 in the third embodiment.

In the third embodiment, the antenna coil 15 is set to either of the normal resonance state or the high-Q resonance state by switching the switch SW2. That is, as illustrated in FIG. 14, the antenna coil 15 is set to the normal resonance state by switching the switch SW2 to OFF, and to the high-Q resonance state by switching the switch SW2 to ON.

Figure 15:
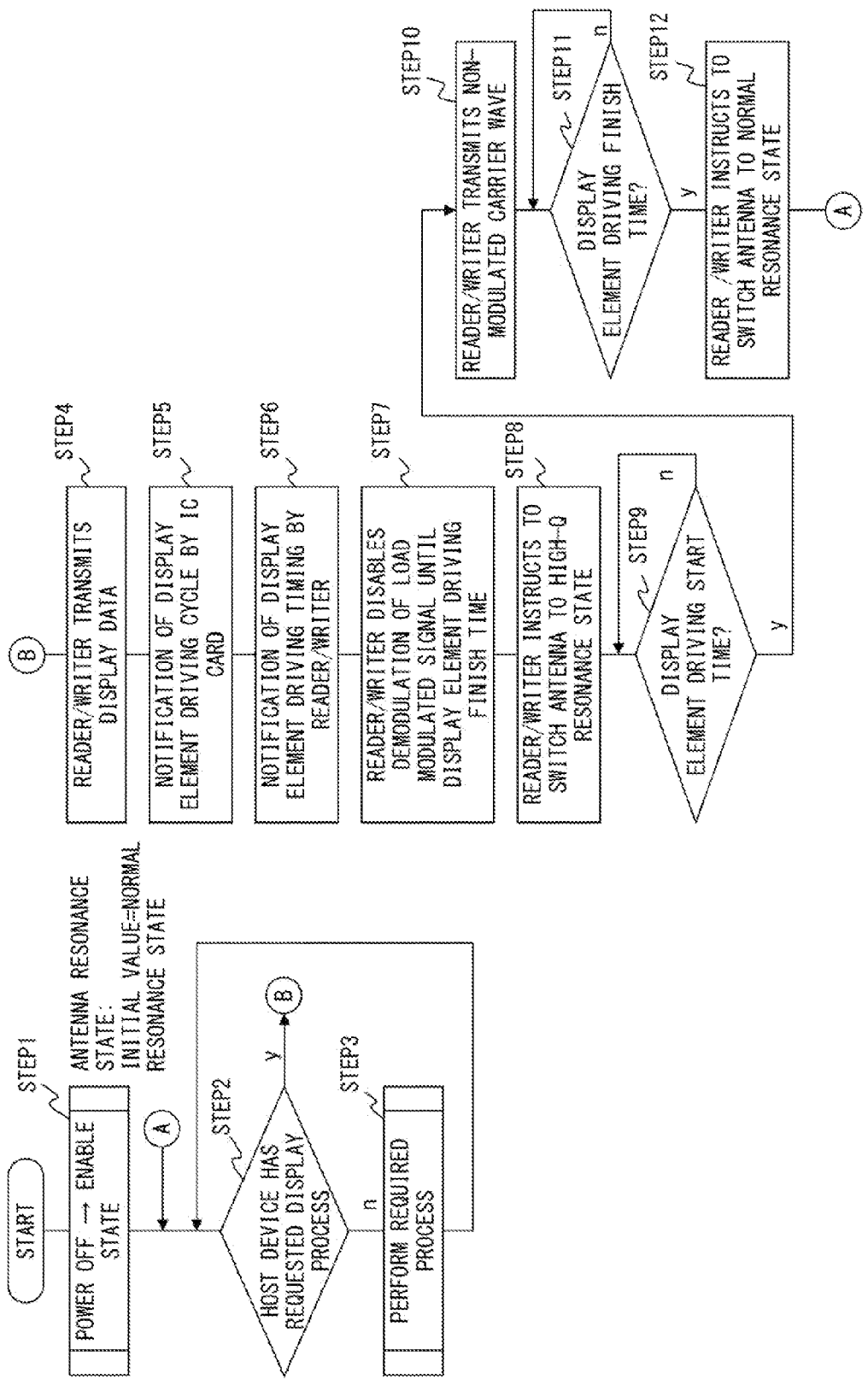
FIG. 15 is a flowchart illustrating the processing operation of the third embodiment.
Figure 16:
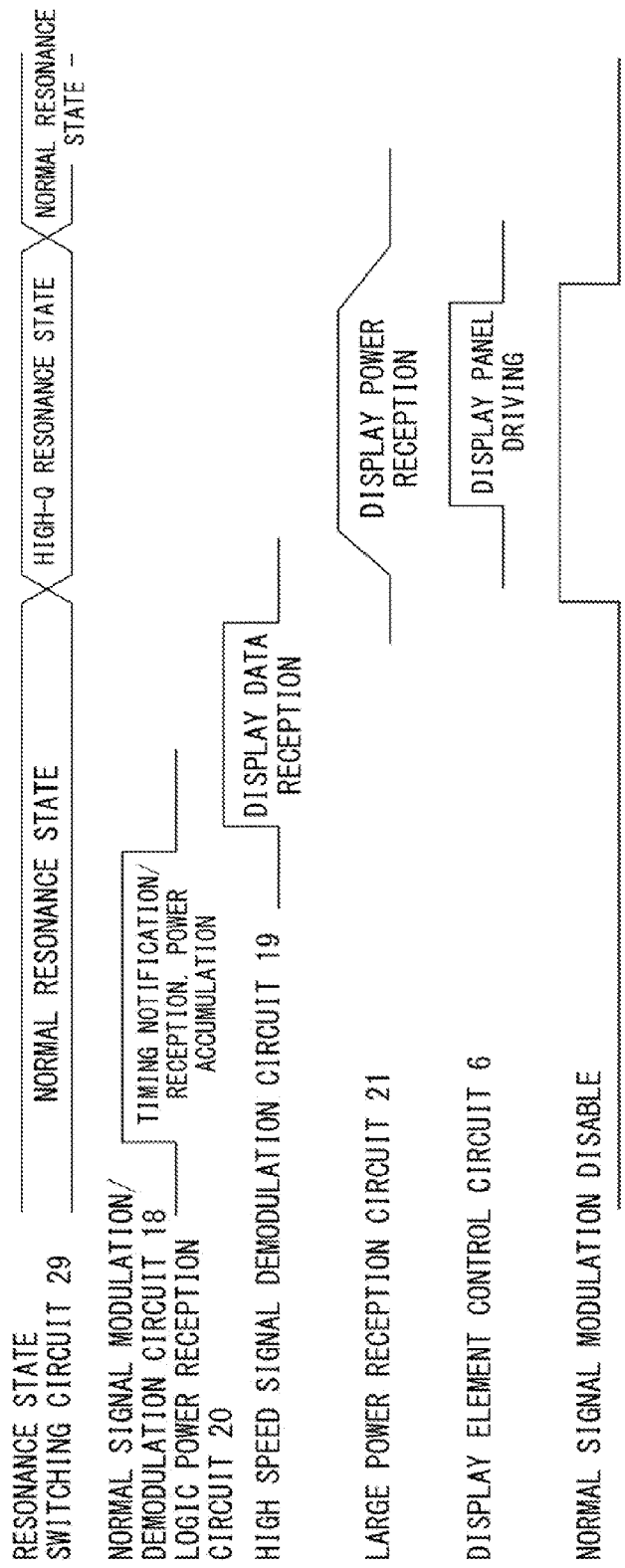
FIG. 16 is a time chart illustrating the processing operation of the third embodiment.

FIG. 15 is a flowchart illustrating the processing operation of the third embodiment. FIG. 16 is a time chart illustrating the processing operation of the third embodiment.

First, when the IC card is in a position distant from the IC card reader/writer 1, the power of the IC card is in the off state. When the IC card is brought close to the IC card reader/writer 1, the IC card is enabled and enters the normal resonance state in the similar manner as described as in the first and second embodiments, and the initial setting process such as an authentication process is performed ((step (hereinafter, indicated by STEP) 1), the first normal resonance state illustrated in FIG. 16).

Next, whether the host device 5 has performed request of a display process is determined (STEP2). Here, if the request from the host device 5 is not a request of a display process (NO in STEP2), the requested process is performed (STEP3).

On the other hand, if the request from the host device 5 is a request of a display process (YES in STEP2), the process to display the display data transmitted from the IC card reader/writer 1 on the memory display element 7 is started.

First, the IC card reader/writer 1 transmits display data to the IC card (STEP4). Meanwhile, the IC card notifies the IC card reader/writer 1 of the driving cycle of the memory display element 7 (STEP5).

Next, the IC card reader/writer 1 notifies the IC card of the driving timing of the display element (STEP6). The calculation of the driving timing of the display element is as described above. The information of the driving start time and the driving finish time of the display element is stored in the RAM (memory 2*d*) as well as being transmitted to the IC card.

Next, the IC card reader/writer 1 disables the demodulation process of the load modulated signal in the detection modulator 3*f* until the driving finish time of the display element (STEP7). By this process, influence of load change in the IC card due to the display process of the memory display element 7 is avoided. Then the IC card reader/writer 1 transmits the display data to the IC card.

The IC card reader/writer 1 transmits an instruction to the IC card to switch the antenna to the high-Q resonance state (STEP 8). According to this instruction, the IC card is set to the high-Q resonance state (the high-Q resonance state illustrated in FIG. 16), and waits for the driving start time of the display element (NO in STEP5).

The driving start time of the display element has been set in STEP5, and when the driving start time comes (YES in STEP9), the IC card reader/writer 1 transmits the non-modulated carrier wave to the IC card (STEP10). At this time, since the antenna of the IC card is set to the high-Q resonance state, the IC card efficiently receives the non-modulated carrier wave, and provides the display element control circuit 6 of a high voltage of about 30V for example.

The display element control circuit 6 drives the memory display element 7 with the provided power, and displays the data transmitted from the control microprocessor 11 on the memory display element 7. At this time, even if the memory display element 7 is a large-screen display element and load change occurs due to the display process, the detection modulator 3*f* has disabled the demodulation process of the load modulated signal as described above. Therefore, load change in the IC card does not affect the IC card reader/writer 1.

Next, whether the driving finish time of the memory display element 7 has come is determined (STEP11). When the driving finish time has come (YES in STEP11), the IC card reader/writer 1 transmits an instruction to switch the antenna of the IC card into the normal resonance state to the IC card (STEP12). According to this instruction, the IC card is set to the normal resonance state (the latter normal resonance state illustrated in FIG. 16). Then, the IC card waits for a new request from the host device 5 (STEP 2).

According the procedure described above, in the third embodiment, when the display process on the memory display element 7 is performed, the demodulation process of the load modulated signal by the detection demodulator 3*f* is also disabled. Therefore, even if load change occurs in the IC card, it does not cause a system error in the IC card reader/writer 1.

In addition, when displaying data on the memory display element 7, since the non-modulated carrier wave is received in the high-Q resonance state, a sufficient power is secured in the IC card. Therefore, even with display on a large-sized display element that covers the entire surface of the IC card, shortage of reception power does not occur.

Fourth Embodiment

The fourth embodiment of the present invention is described. In the fourth embodiment, it is also assumed that the IC card illustrated in FIG. 1 and the IC card reader/writer 1 illustrated in FIG. 2 are used. Hereinafter, specific explanation is provided.

Figure 17:
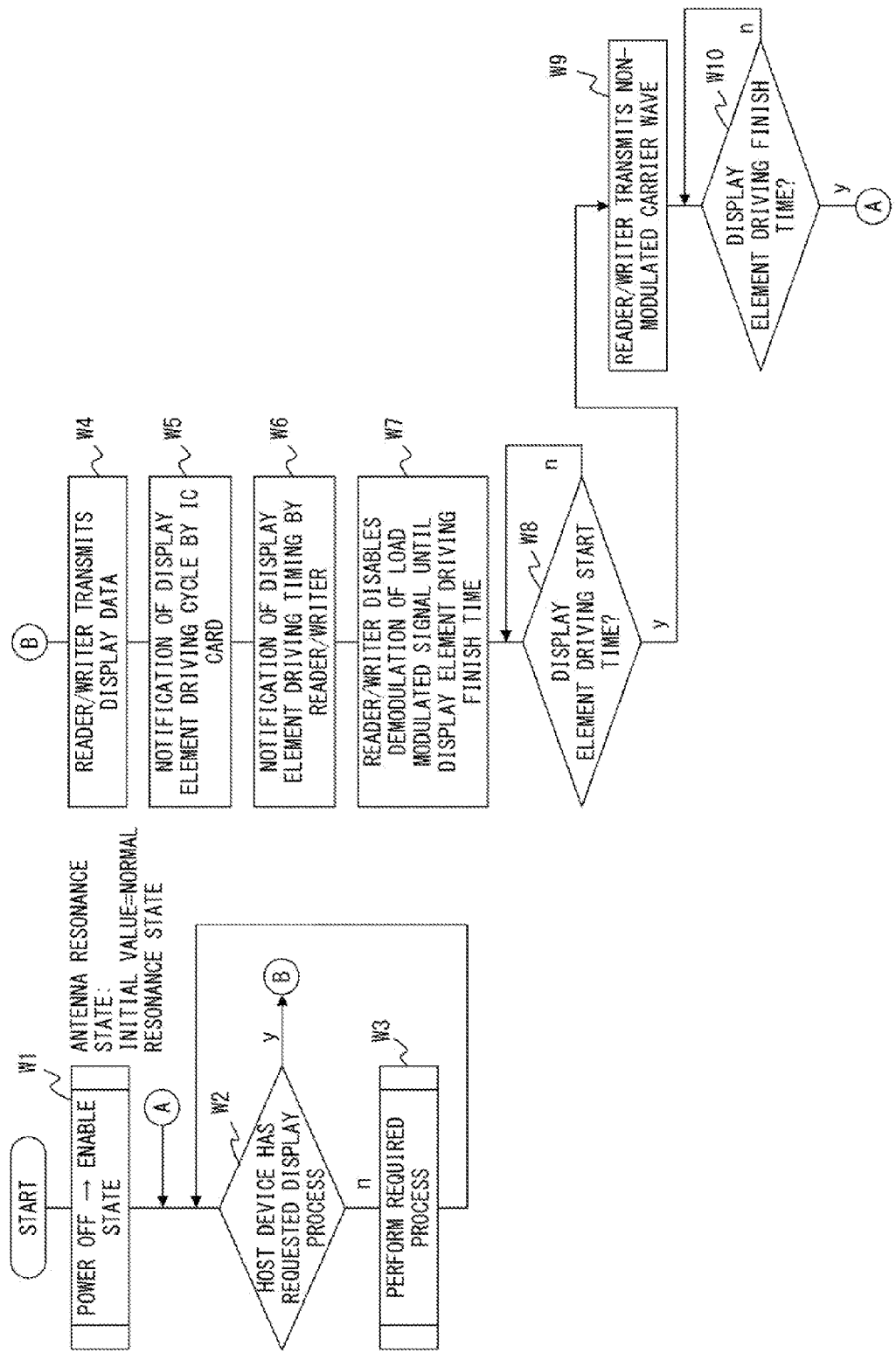
FIG. 17 is a flowchart illustrating the processing operation of the fourth embodiment.

FIG. 17 is a flowchart illustrating the processing operation of the fourth embodiment. FIG. 18 is a time chart illustrating the processing operation of the fourth embodiment.

First, when the IC card is in a position distant from the IC card reader/writer 1, the power of the IC card is in the off state. When the IC card is brought close to the IC card reader/writer 1, the IC card is enabled and enters the normal resonance state in the similar manner as described as in the first through third embodiments, and the initial setting process such as an authentication process is performed (step (hereinafter, indicated by W) 1). The processes in the fourth embodiment are performed in the normal resonance state.

Next, whether the host device 5 has performed request of a display process is determined (W2). Here, if the request from the host device is not a request of a display process (NO in W2), the requested process is performed (W3).

On the other hand, if the request from the host device 5 is a request of a display process (YES in W2), the process to display the data transmitted from the IC card reader/writer 1 on the memory display element 7 is started.

First, the IC card reader/writer 1 transmits display data to the IC card (W4). In addition, the IC card notifies the IC card reader/writer 1 of the driving cycle of the memory display element 7 (W5).

Next, the IC card reader/writer 1 notifies the IC card of the driving timing of the display element. At this time, in the similar manner as in the first through third embodiments, notification of the driving start time and the driving finish time is performed.

The IC card reader/writer 1 disables the demodulation process of the load modulated signal in the detection modulator 3*f*, until the driving finish time of the display element (W7). Accordingly, influence of load change in the IC card due to the display process of the memory display element 7 is avoided. Then, the IC card reader/writer 1 transmits the display data to the IC card.

Then the IC card reader/writer 1 waits for the driving start time of the display element (NO in W8). The driving start time of the display element has been set in step W6. When the driving start time comes (YES in W8), the IC card reader/writer 1 transmits the non-modulated carrier wave to the IC card (W9) to generate a high voltage power to drive the memory display drive 7.

The display element control circuit 6 drives the memory display element 7 with the provided power, and displays the data transmitted from the control microprocessor 11 on the memory display element 7. Then, whether the driving finish time of the memory display element has come is determined (W10), and when the driving finish time has come (W10), the display process described above is terminated. Then, the IC card reader/writer 1 waits for a new request from the host device 5 (W2).

According to the procedure described above, also in the fourth embodiment, when the display process on the memory display element 7 is performed, the demodulation process of the load modulated signal by the detection demodulator 3*f* is disabled. Therefore, even if load change occurs in the IC card, it does not cause a system error in the IC card reader/writer 1.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions has (have) been described in detail, it should be understood that the various changes, substitutions, and alterations could be made hereto without departing from the spirit and scope of the invention.

What is claimed is:

1. A non-contact integrated circuit (IC) card system comprising,
    a non-contact IC card having a display element; and
    an IC card reader/writer communicating with the non-contact IC card, wherein
    the IC card reader/writer disables detection of a load modulated signal from the non-contact IC card when the non-contact IC card displays data on the display element.

2. The non-contact IC card system according to claim 1, wherein
    the non-contact IC card has a switch unit to control a resonance state of an antenna coil of the non-contact IC card.

3. The non-contact IC card system according to claim 2, wherein
    the switching unit switches the state of the antenna coil into non-resonance state when the non-contact IC card performs high speed transmission with the IC card reader/writer.

4. The non-contact IC card system according to claim 2, wherein
    the switching unit switches the state of the antenna coil into a resonance state with a higher quality factor (Q) compared with a normal resonance state when the non-contact IC card receives power from the IC card reader/writer to drive the display element.

5. The non-contact IC card system according to claim 4, wherein
    the IC card reader/writer transmits non-modulated carrier wave to the non-contact IC card when the antenna coil is controlled to be high Q resonance state.

6. The non-contact IC card system according to claim 2, wherein
    the non-contact IC card has power storage unit to accumulate power when the antenna coil is controlled to be normal resonance state.

7. The non-contact IC card system according to claim 6, wherein
    the power storage unit is a capacitor.

8. The non-contact IC card system according to claim 2, wherein the switching unit includes:
    a capacitor connected in parallel with the antenna coil;
    a first switch to connect or disconnect between the antenna coil and the capacitor;
    a first resistor connected in series with the antenna coil;
    a second resistor connected in parallel with the antenna coil; and
    a second switch connected in parallel with the first resistor, and wherein
    the resistance of the first resistor is larger than the resistance of an internal resistor of the antenna coil, and the resistance of the second resistor is larger than the resistance of the first resistor;
    the antenna coil is connected only to the second resistor in the non-resonance state;
    the antenna coil is connected to the first resistor in the normal resonance state; and
    the antenna coil is connected to the capacitor in the high quality factor (Q) resonance state.

9. The non-contact IC card system according to claim 2, wherein the switching unit includes:
    a capacitor connected in parallel with the antenna coil;
    first and second resistors connected in series between the antenna coil and the capacitor;
    a first switch connected in parallel with the first resistor; and
    a second switch connected in parallel with the second resistor, and wherein
    the resistance of the first resistor is larger than the resistance of an internal resistance of the antenna coil, and
    the resistance of the second resistor is larger than the resistance of the first resistor;
    the first and second switches are set to be OFF in the non-resonance state;
    the first switch is set to be OFF and the second switch is set to be ON in the normal resonance state; and
    the first and second switches are set to be ON in the high quality factor (Q) resonance state.

10. The non-contact IC card system according to claim 1, wherein
    the IC card reader/writer includes a demodulator to detect load modulated signal from the non-contact IC card, and
    the demodulator disables detection of the load modulated signal when the non-contact IC card displays data on the display element.

11. The non-contact IC card system according to claim 1, wherein
    the IC card reader/writer collects driving cycle information of the display element from the non-contact IC card, and notifies the non-contact IC card of a transmission timing of display data to be transmitted from the IC card reader/writer to the non-contact IC card and a driving timing of the display element before the IC card reader/writer disables the detection.

12. An integrated circuit (IC) card reader/writer for communicating with a non-contact integrated circuit (IC) card having a display element, wherein
    the IC card reader/writer disables detection of a load modulated signal from the non-contact IC card when the non-contact IC card displays data on the display element.

13. A control method of a non-contact integrated circuit (IC) card system having a non-contact IC card and an IC card reader/writer communicating with the non-contact IC card, wherein
    the IC card reader/writer disables detection of a load modulated signal from the non-contact IC card when the non-contact IC card displays data on a display element.

* * * * *